3,803,334
PARBOILED RICE PRODUCT
John W. Hunnell, Houston, Tex., assignor to Riviana Foods Inc., Houston, Tex.
No Drawing. Filed June 28, 1971, Ser. No. 157,708
Int. Cl. A23l 1/10
U.S. Cl. 426—208                                    5 Claims

ABSTRACT OF THE DISCLOSURE

A dry packaged rice product containing as a principal ingredient precooked parboiled rice and a small amount of a food-grade acid. It has been found that the presence of small amounts of adipic acid, preferably above about 0.3%, or an equivalent amount of another food grade acid produces whitening of the discolored parboiled rice when it is subjected to heat and moisture for rehydration of the precooked parboiled rice.

BACKGROUND OF THE INVENTION

(A) Field of the invention

This invention relates to a new precooked parboiled rice product which contains as an essential ingredient a food-grade acid in sufficient amount to produce visibly noticeable whitening of the parboiled rice grains in the composition when they are subjected to heat and moisture for rehydration.

The parboiling of rice is known and used in a number of Asian countries where it has apparently been practiced for several centuries. In these countries the parboiling process originally involved steeping rough rice paddy (unhulled rice) for periods up to three or four days at temperatures ranging up to the boiling point of water. Thereafter the paddy was spread in the sun for drying, and the dried rice was milled as desired.

Modern parboiling employs essentially the same procedure, but the processing time has generally been reduced. Modern parboiling is accomplished by soaking the rough rice paddy in cold, warm or hot water for a substantial period of time until the rice grains have increased their moisture content (generally to at least above 20%); draining the rice; and then steaming the rice, usually at superatmospheric pressure for periods ranging from about 15 minutes to an hour or more. Subsequently, paddy rice is hulled to produce parboiled brown rice which is then customarily milled to produce conventional parboiled rice.

A major advantage of the parboiling process is that during the steaming step nutritional elements in the bran coating, such as vitamins and minerals are conveyed into the endosperm of the rice grain. The parboiling process also provides advantages in that: (1) parboiled rice keeps better both before and after cooking; (2) parboiled rice is more resistant to insect infestation; (3) breakage in the milling step is substantially reduced and a higher yield of milled rice is obtained; (4) a distinctive flavor is imparted to the rice grains, this flavor being preferred by some users; and (5) the cooking time is not as critical, and "overcooking" is not as likely to result in sticky or mushy grains.

One disadvantage of parboiled rice compared to raw white rice is that conventional parboiled rice requires a longer kitchen cook time to prepare it for serving. Such cooking time can be materially reduced by precooking the parboiled rice. Precooking processes require immersion cooking or a combination of immersion cooking and steaming of the parboiled rice to gelatinize its starch content. Processes for precooking parboiled rice are known in the art, for example, see Autrey et al. Pat. No. 3,189,462 and Lynn et al., Pat. No. 3,432,309.

Unfortunately, even though the processing time for preparing parboiled rice for table use may be reduced by a precooking process, there remains a serious problem of acceptability of parboiled rice because of its appearance. The parboiling process stains or discolors the endosperm of the rice grain so that the color of the cooked product is not nearly as white as that of cooked raw milled rice. Tests indicate that many consumers prefer the whiter cooked product.

(B) Prior art

In the past, the use of acidified or buffered water for the cooking of rice has occasionally been suggested as a means for controlling the hydrolysis of the starch and the texture of the cooked rice. Wilbur, Pat. No. 2,187,718 teaches a process for canning rice in which the rice to be canned is cooked with an acid ingredient to produce changes in the rice grains to prevent or reduce the granulation and agglomeration of the rice grains during storage in the can.

Wayne Pat. No. 3,085,011 discloses a process for cooking rice in industrial plants or large commercial establishments wherein the rice is steeped and cooked in acidified water. The patent suggests that if acidities are too high, excessive hydrolysis of the starch and glutenins of the rice may result, whereas cooking in an alkaline water may discolor the cooked rice.

It is further believed that some recipe books have suggested the addition of small amounts of vinegar or lemon juice to raw rice during cooking.

SUMMARY OF THE INVENTION

It is the discovery of this invention that precooked discolored, parboiled rice may be significantly whitened during the step of rehydration by the addition of an acidic material.

It is a further discovery of this invention that dried, discolored parboiled rice may be mixed with and packaged together with a dry food-grade acid and that upon rehydration of the discolored parboiled rice a significant reduction in the discoloration of the cooked parboiled rice is produced by the presence of the acid component.

In one aspect of the invention, a dry packaged rice product is provided which contains as its principal ingredient a precooked parboiled rice. The parboiled rice is significantly discolored by the parboiling process, and such discoloration is not materially reduced by the cooking process (precooking) even in the presence of an acid. The starch content of the parboiled rice has been gelatinized by precooking, and the so-called kitchen "cooking" by the consumer actually constitutes rehydration of the gelatinized starch. It is the surprising discovery of the present invention that the presence of acid with the discolored precooked rice during rehydration results in significant whitening of the rehydrated rice.

DESCRIPTION OF THE PREFERRED EMBODIMENTS

Tests have been conducted upon a number of acidic materials to determine their effect upon precooked parboiled rice. In an initial series of tests, acids as set forth in Table I below were employed at about 0.00416 mole concentration and the effect of such concentration of acid was visually compared with a control specimen comprising a specimen of cooked parboiled rice from the same lot of parboiled rice. The particular precooked parboiled rice was a typical, commercially available parboiled rice comprising a mixture of Bell Patna and Starbonnett varieties of rice which had been parboiled in the conventional manner. This parboiled rice was precooked by cooking for a total cooking time of about 24 to 29 minutes at 190 to 210° F. A two-step cooking procedure was used wherein immersion cooking amounted to 20 to 23 minutes at about 200° F. for a period of from 4 to 6 minutes. The cooked rice was then washed and dried by heated air at temperatures ranging from about 230 to 300° F. for about 30 minutes.

Preliminary tests of various acids are set forth below in Table I wherein the precooked rice was rehydrated by heating the rice in one quart of water at approximately boiling temperature for about 12 to 15 minutes. The amount of acid used is indicated in the table in each instance and for each acid the amount selected was calculated to be about .00416 mole. The amount of precooked parboiled rice used in each instance was 148 grams, and after rehydration the excess water was drained from the rice.

TABLE I

| Acid: | Acid amount (grams) | Acid as percent of rice | Flavor |
|---|---|---|---|
| Acetic | 0.25 | 0.169 | Vinegar. |
| Phosphoric | 0.44 | 0.298 | Chemical. |
| Adipic | 0.608 | 0.41 | Bland. |
| Fumaric | 0.482 | 0.326 | Do. |
| Tartaric | 0.624 | 0.421 | Do. |
| Succinic | 0.491 | 0.332 | Astringent. |
| Lactic | 0.374 | 0.352 | Cheesey. |
| Malic | 0.558 | 0.376 | Bland. |
| Ascorbic | 0.732 | 0.495 | Do. |

In each instance the amount of acid employed produced some whitening of the precooked parboiled rice compared with a control sample in which the same water and the same rice were employed but without the acid.

Thereafter, a series of tests as set forth in Table II were conducted in which adipic acid was employed in percentages ranging from 0 (control) to 0.5% adipic acid based upon the weight of the rice. Test conditions and the parboiled rice used for these tests were the same as those set forth in the series of tests of Table I. The cooked specimens were evaluated for whiteness by using the Agtron M–31–A solid state reflectometer produced by Magnuson Engineers, Inc., San Jose, Calif. with a Model M–30–A wide area viewer. The Agtron meter was calibrated at 0 with a standard nonreflective plate and at 90 by use of a standard white enamel plate. Each specimen of cooked parboiled rice was inserted in the Agtron sample container. The sample container is rotated by hand to obtain an average meter reading to the nearest 0.5 Agtron unit. The resulting direct reading of reflectance gives an objective whiteness test which is hereinafter indicated as "Agtron units."

An evaluation of the whiteness achieved by varying the amount of adipic acid is indicated in the table below.

TABLE II

Percent acid/
weight of rice: Agtron units
0.5 ------------------------------------- 78
0.4 ------------------------------------- 76
0.3 ------------------------------------- 74
0.2 ------------------------------------- 72
0.0 ------------------------------------- 68

It was observed that increased whitening of the discolored precooked parboiled rice was achieved by increasing the percent acid to 0.5%. However, it has been found that at about 0.5% adipic acid and above as based upon the weight of the rice, the flavor of the dehydrated rice is affected. Although adipic acid is a relatively bland food-grade acid, a slight tartness and/or astringent property can be detected by many persons tasting the prepared dehydrated rice as the acid levels are increased above 0.5%. Accordingly, it is presently preferred that adipic acid be used in amounts sufficient to whiten the precooked parboiled rice but such amounts be maintained below about 0.5% of the precooked parboiled rice.

In another series of tests additional specimens of precooked parboiled rice of the same type as that tested as discussed above were rehydrated at boiling temperature with 0.3% and 0.4% adipic acid (on the basis of rice weight). These tests were conducted to compare the results of using dionized water compared with tap water. Test results are summarized in Table III below.

TABLE III

| Rice composition | Agtron units with— | |
|---|---|---|
| | Dionized water | Tap water |
| Control | 73.5 | 70.0 |
| With 0.3% adipic acid | 74.0 | 75.2 |
| 0.4 adipic acid | 74.8 | 76.2 |

It should be noted that the addition of adipic acid improved the cooked color of all samples tested, but that the samples cooked in tap water showed greater lightening of color with increased proportions of adipic acid than did those cooked in dionized water.

By way of further comparison, it should be noted that the use of adipic acid at 0.3% and 0.4% levels for parboiled rice which was not precooked but which had the same descriptive properties as the parboiled rice used in the precooked parboiled rice used in the preceding tests (a mixture of Bell Patna and Starbonnet) resulted in an increase from 60.8 Agtron units for the control to only 64.0 units with both 0.3% adipic acid and 0.4% adipic acid. Thus, the precooking tends to whiten the parboiled rice somewhat; however, there is also a surprising and unexpected increase in the effectiveness of the whitening by the addition of adipic acid to precooked parboiled rice compared with such addition to conventional parboiled rice.

Unfortunately nearly all food acids are hydroscopic and since it is essential that rice be allowed to respire during storage (see U.S. Pat. 3,322,293) it is highly desirable that a nonhydroscopic acid be used if the rice product is to be stored for any period of time. For a packaged product to be marketed for sales to home consumers, a non-hydroscopic food grade acid in powder form is considered highly desirable.

It has been found that several food-grade acid powders can be dusted onto precooked parboiled rice or dissolved in water and sprayed onto the rice with subsequent drying to give a desired admixture of precooked parboiled rice with food-grade acid powders. When the packaged rice has been coated or mixed with such a food-grade acid, the dry acid powder is retained with the rice to be dissolved in the water used for rehydration of the precooked rice product. As noted above, non-hydroscopic food acids such as adipic acid and fumaric acid are preferred.

It has been found that the rehydration of the precooked parboiled rice composition of this invention results in noticeably whiter prepared rice. Such whiter rice has been found to be preferred by many consumers over the less white rice prepared from conventional parboiled rice. Another nonobvious benefit resulting from the incorporation of food-grade acid with precooked parboiled rice is a very substantial increase in the preservation of the thiamine in the prepared rice. It is a known fact that thiamine is rapidly destroyed in neutral or alkaline water at high temperature. The presently recommended proportion of rehydration water with the rice composition of this invention is about one quart of water for quantities of rice ranging from about 113 grams (4 ozs.) to about 150 grams (about 5¼ ozs.). Under these recommended rehydration conditions preliminary results indicate that a substantial proportion of thiamine content of the precooked parboiled rice is maintained throughout the rehydration procedure.

In the practice of this invention it is presently preferred that adipic acid be used and that it be used in proportions above about 0.3 weight percent based upon the weight of the rice. Other food-grade acids, preferably non-hydroscopic acids, may be substituted for adipic acid in amounts which will provide the acid equivalent of above 0.3% adipic acid.

I claim:

1. A dry rice product comprising a precooked discolored parboiled rice and admixed therewith sufficient food-grade acid to increase the preservation of thiamine in the prepared rice and whiten said precooked parboiled rice when said rice is rehydrated by moisture and heat.

2. The product of claim 1 wherein said food-grade acid is a non-hydroscopic acid.

3. The product of claim 1 wherein said food-grade acid is adipic acid.

4. The product of claim 3 wherein the amount of said adipic acid is above 0.3% of the weight of said parboiled rice.

5. The product of claim 3 wherein the amount of said adipic acid is between about 0.3 and 0.5% of the weight of said parboiled rice.

References Cited

UNITED STATES PATENTS

| | | | |
|---|---|---|---|
| 2,720,460 | 10/1955 | Flynn et al. | 99—80 PS |
| 3,085,011 | 4/1963 | Wayne | 99—80 PS |

FOREIGN PATENTS

| | | | |
|---|---|---|---|
| 807,084 | 8/1955 | Great Britain | 99—80 PS |

OTHER REFERENCES

Matz, "The Chemistry & Technology of Cereals as Food and Feed," Avi Publishing Co., Inc., 1959, pp. 445–449.

RAYMOND N. JONES, Primary Examiner

U.S. Cl. X.R.

426—331

UNITED STATES PATENT OFFICE
CERTIFICATE OF CORRECTION

Patent No. 3,803,334　　　　　　　　Dated April 9, 1974

Inventor(s) John W. Hunnell

It is certified that error appears in the above-identified patent and that said Letters Patent are hereby corrected as shown below:

Column 2, line 13, "for" should be -- of --

Column 2, line 68, "Starbonnett" should be -- Starbonnet --

Column 3, line 64, "dehydrated" should be -- rehydrated --

Signed and sealed this 3rd day of September 1974.

(SEAL)
Attest:

McCOY M. GIBSON, JR.　　　　　　　　C. MARSHALL DANN
Attesting Officer　　　　　　　　　　Commissioner of Patents